United States Patent
Elg et al.

(10) Patent No.: US 11,348,303 B2
(45) Date of Patent: May 31, 2022

(54) METHODS, DEVICES, AND COMPUTER PROGRAM PRODUCTS FOR 3D TEXTURING

(71) Applicant: SONY CORPORATION, Tokyo (JP)

(72) Inventors: Johannes Elg, Helsingborg (SE); Fredrik Olofsson, Lund (SE); Lars Novak, Bjärred (SE); Pal Szasz, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/642,078

(22) PCT Filed: Aug. 31, 2017

(86) PCT No.: PCT/US2017/049580
§ 371 (c)(1),
(2) Date: Feb. 26, 2020

(87) PCT Pub. No.: WO2019/045723
PCT Pub. Date: Mar. 7, 2019

(65) Prior Publication Data
US 2020/0211255 A1    Jul. 2, 2020

(51) Int. Cl.
*G06T 15/04*    (2011.01)

(52) U.S. Cl.
CPC .................... *G06T 15/04* (2013.01)

(58) Field of Classification Search
CPC .............................. G06T 15/04; G06T 11/001
See application file for complete search history.

(56) References Cited

U.S. PATENT DOCUMENTS

2002/0085748 A1*  7/2002  Baumberg .............. G06T 15/04
                                                              382/154
2003/0001837 A1    1/2003  Baumberg
                                    (Continued)

OTHER PUBLICATIONS

Baumberg, A., "Blending Images for Texturing 3D Models," Proceedings of the British Machine Vision Conference, Sep. 5, 2002, pp. 404-413.

(Continued)

*Primary Examiner* — Jitesh Patel
(74) *Attorney, Agent, or Firm* — Myers Bigel, P.A.

(57) ABSTRACT

Methods of creating a texture for a three-dimensional (3D) model using frequency separation and/or depth buffers are provided. Frequency separation may include splitting one or more images each into higher frequency components (which includes finer details such-as facial pores, lines, birthmarks, spots, or other textural details) and lower frequency components (such as color or tone). Depth buffering may include storing higher frequency components of the images within a depth buffer based on a distance of a corresponding vertex in the 3D model from the camera coordinate system, and then, using the closest pixel to the camera. This pixel likely has a highest amount of sharpness or detail. The lower frequency components can be averaged to account for illumination differences, but because the high frequency components have been separated, detail in the final texture may be preserved. Related devices and computer program products are also provided.

19 Claims, 8 Drawing Sheets

(56) References Cited

U.S. PATENT DOCUMENTS

2005/0190985 A1* 9/2005 Hunt ....................... G06T 5/002
382/264
2012/0120192 A1* 5/2012 Alregib ................ H04N 13/139
348/43

OTHER PUBLICATIONS

Zhaolin Chen, et al. "3D Texture Mapping in Multi-View Reconstruction," Advances in Visual Computing, Springer Berlin Heidelberg, Jul. 16, 2012 pp. 359-371.
Marco Callieri, "Reconstructing Textured Meshes from Multiple Range+rgb Maps," 7th Int. Fall Workshop on Vision, Modeling, and Visualization 2002, Nov. 20, 2002, pp. 419-426.
Walkowski F., et al. "Texture Mapping for the FastSCAN™ Hand-Held Laser Scanner," Image and Vision Computing, 23rd International Conference, IEEE, Piscataway, NJ, Nov. 26, 2008, pp. 1-6.
Jiapeng Liu, "Seamless Texture Mapping Algorithm for Image-Based Three-Dimensional Reconstruction," Journal of Electronic Imaging, SPIE International Society for Optical Engineering, US, vol. 25, No. 5, Sep. 1, 2016.

* cited by examiner

METHODS, DEVICES, AND COMPUTER PROGRAM PRODUCTS FOR 3D TEXTURING

CROSS REFERENCE TO RELATED APPLICATION

This application is a 35 U.S.C. § 371 national stage application of PCT International Application No. PCT/US2017/049580, filed on Aug. 31, 2017, the content of which is incorporated herein by reference in its entirety. The above-referenced PCT International Application was published in the English language as International Publication No. WO 2019/045723 A1 on Mar. 7, 2019.

FIELD

The present disclosure relates to image processing, and more particularly, to methods and devices for three-dimensional (3D; modeling.

BACKGROUND

Three-dimensional (3D) modeling may be used to create a representation of an object for use in a variety of applications, such as augmented reality, 3D printing, 3D model development, and so on. A 3D model may be defined by a collection of points in 3D space connected by various geometric entities such as triangles, lines, curved surfaces, or the like. One potential way to generate a 3D model of an object is via 3D scanning of the object. Although there are various methods to perform 3D scanning, one area of potential growth and development includes capturing a set of images by an image capture device. A collection of points in 3D space may be determined from corresponding feature points in the set of images. A mesh representation (e.g., a collection of vertices, edges, and faces representing a "net" of interconnected primitive shapes, such as triangles) that defines the shape of the object in three dimensions may be generated from the collection of points. Refinements to the mesh representation may be performed to further define details.

Creating a 3D mesh of an object only provides one component of the overall 3D model. In order for the virtual representation of Sic object to look realistic, color information is desirable. Known systems simply utilize a per-vertex color: for each vertex of the mesh a color triplet (RGB) may be specified. The color for each pixel in the rendered mesh may be interpolated from these colors. The color resolution for per-vertex methods are very low, and the resultant model has a low degree of detail and is not realistic.

Texturing is one technique that may achieve better color quality than the per-vertex color methods. In texturing, one or several images are created in addition to the 3D mesh, and these images may be mapped onto the surface of the mesh. For each primitive shape (e.g., triangle) in the mesh there is a corresponding triangle in the texture image.

A texture image may be created from the 3D mesh and the set of images captured by an image capture device. However it has beer recognized by the inventors that many challenges are present in texturing and in the creation of the texture image. For example, a texture image creation algorithm may need to be capable of handling illumination differences in the input images.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of present inventive concepts.

The present disclosure provides devices, computer program products, and methods of creating a texture for a digital three-dimensional (3D) model based oil captured image data including a plurality of images. For example, the methods may include: separating each image from the captured image data into frequency components, where the frequency components include a low frequency component and a high frequency component for each image: assigning the low and high frequency components of each image to texture coordinates of the texture; and accumulating the low frequency components of the plurality of images, resulting in accumulated low frequency components. The method also includes accumulating the high frequency components of the plurality of images, resulting in accumulated high frequency components. The method also includes combining the accumulated low frequency components and the accumulated high frequency components, resulting in the texture. Other embodiments of this aspect include corresponding computer systems, devices, and computer program products recorded on one or more computer storage devices, each configured to perform the actions of the methods.

Furthermore, one or more of the following features may be included. The plurality of images may include a first image, and separating into frequency components may include: blurring the first image, resulting in a low frequency component of the first image; and determining a difference between the first image and the low frequency component, resulting in a high frequency component of the first image. A four pixel blur kernel may be used to blur the first image.

The plurality of images may include a first image and a second image, and accumulating the low frequency components may include adding a low frequency component of the first image to a low frequency component of the second image. The low frequency component of the first image may include a first color value, the low frequency component of the second image may include a second color value, and adding the low frequency component of the first image to the low frequency component of the second image may include adding the first color value and the second color value.

Accumulating the high frequency components of the plurality of images may include comparing depth values of the high frequency components of the plurality of images and storing a pixel having a lowest depth value of the depth values that are compared.

The method and other embodiments of this aspect may further include: receiving, in a storage medium, the captured image data from an image capture device.

The captured image data may include image data representative of a physical object, and a digital mesh representation of the physical object may be created. As such, the method and other embodiments of this aspect may further include: determining a texture mapping for the mesh representation. Determining the texture mapping for the mesh representation may include: creating a smooth copy of the mesh representation; creating one or more texture islands to be packed into the texture mapping; and packing the one or more texture islands into the texture mapping.

The method and other embodiments of this aspect may further include: applying data to one or more gaps of the texture based on data from a lower resolution version of the texture.

Another aspect of the present disclosure includes a computer program product including: a non-transitory computer readable storage medium including computer readable program code therein that when executed by a processor causes the processor to perform operations including: separating each image of a plurality of images into frequency components, where the frequency components include a low frequency component and a high frequency component for each image; assigning the frequency components of each image to texture coordinates of a texture; and accumulating the low frequency components of the plurality of images, resulting in accumulated low frequency components. The computer program product also includes accumulating the high frequency components of the plurality of images, resulting in accumulated high frequency components. The computer program product also includes combining the accumulated low frequency components and the accumulated high frequency components, resulting in the texture.

Another aspect of the present disclosure provides an electronic device including: a processor; and a storage device that is coupled to the processor and including computer readable program code therein that when executed by the processor causes the processor to perform operations including: separating each image of a plurality of images into frequency components, where the frequency components include a low frequency component and a high frequency component for each image: assigning the frequency components of each image to texture coordinates of a texture; accumulating the low frequency components of the plurality of images, resulting in accumulated low frequency components: accumulating the high frequency components of the plurality of images, resulting in accumulated high frequency components; and combining the accumulated low frequency components and the accumulated high frequency components, resulting in the texture.

BRIEF DESCRIPTION OF THE DRAWINGS

The accompanying drawings, which form a part of the specification, illustrate various embodiments of the present inventive concepts. The drawings and description together serve to fully explain embodiments of the present disclosure.

DETAILED DESCRIPTION

Three-dimensional (3D) scanning involves the capturing of data representative of a 3D object. In some situations, this data may be captured via an image capturing process, and an image or sequence of images may be processed to locale and determine a collection of points in 3D space. As discussed above, a mesh representation (e.g., a collection of vertices, edges, and faces representing a "net" of interconnected primitive shapes, such as triangles) that defines the shape of the object in three dimensions may be generated from the collection of points.

Figure 1A:
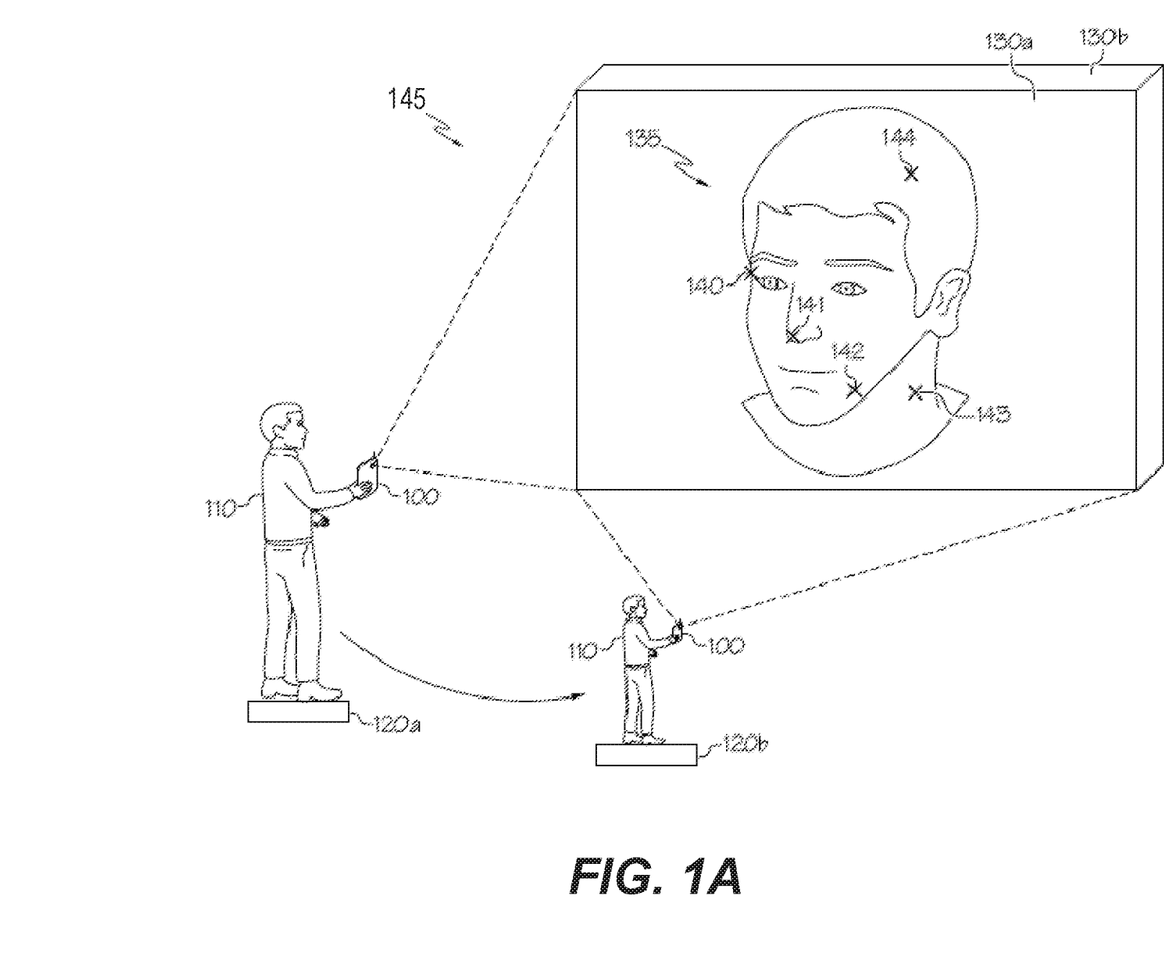
FIG. 1A is a diagram that illustrates a user capturing multiple images of an object with an electronic device, according to the present disclosure.

As part of context for the present application, FIG. 1A is a diagram that illustrates a user 110 capturing multiple images 130 of a physical object 135 with an electronic device 100, according to various embodiments of present inventive concepts. Although FIG. 1A illustrates an example in which the images 130 are captured by an image capture device 240 (FIG. 2A) at the electronic device 100, the images 130 may alternatively be captured by another device and subsequently received by the electronic device 100.

In FIG. 1A, the user 110 initiates a photographic session of the object 135, such as a head of a person or an automobile, at location 120a. The object 135 may be in a physical environment 145, which may be an interior room or an outdoor location. The user 110 may physically move in the environment 145 around the object 135 to various locations, such as from the location 120a to a different location 120b. An image 130 of the object 135 and of the environment 145 may be captured at each location. For example, image 130a is captured when the electronic device 100 is at the location 120a, and image 130b is captured when the electronic device 100 moves to the different location 120b. The captured images 130 may each be two-dimensional (2D) images, and may have a foreground part, which may largely include the object 135 and a background part which may largely include other objects or other components (e.g., walls and/or wall decorations, furniture, exterior walls, fences) in the environment 145.

The electronic device 100 may provide images 130 at various angles as the user 110 walks around the object 135. For example, the user 110 may capture images 130 around 360 degrees (or, alternatively, at least 180 degrees) of the object 135 and of the environment 145. After capturing at least two images 130, such as the images 130a and 130b, the images 130 may be processed by a processor 250 (FIG. 2A) in the electronic device 100, or by a processor external to the electronic device 100, to construct a preliminary digital 3D model 150 (FIG. 1B) of the physical object 135, or to otherwise generate a 3D image. The terms "construct" (or "constructing"), "generate" (or "generating"), and "build" (or "building") may be used interchangeably herein.

Processing of the images 130 may include identifying points 140-144 of the object 135 as captured in the images 130. The points 140-144 may include various edges, corners, or other points on a surface of the object 135. The points 140-144 may be recognizable locations on the physical object 135 that are tracked in various images 130 of the physical object 135. In some embodiments, constructing a preliminary 3D model 150 of the object 135 may involve capturing several (e.g., three, four, five, or more) images 130 of the object 135 and identifying tens, hundreds, or thousands of points 140-144. Locations (e.g., coordinates) of the points 140-144 may be estimated using various modeling/statistical techniques.

Figure 1B:
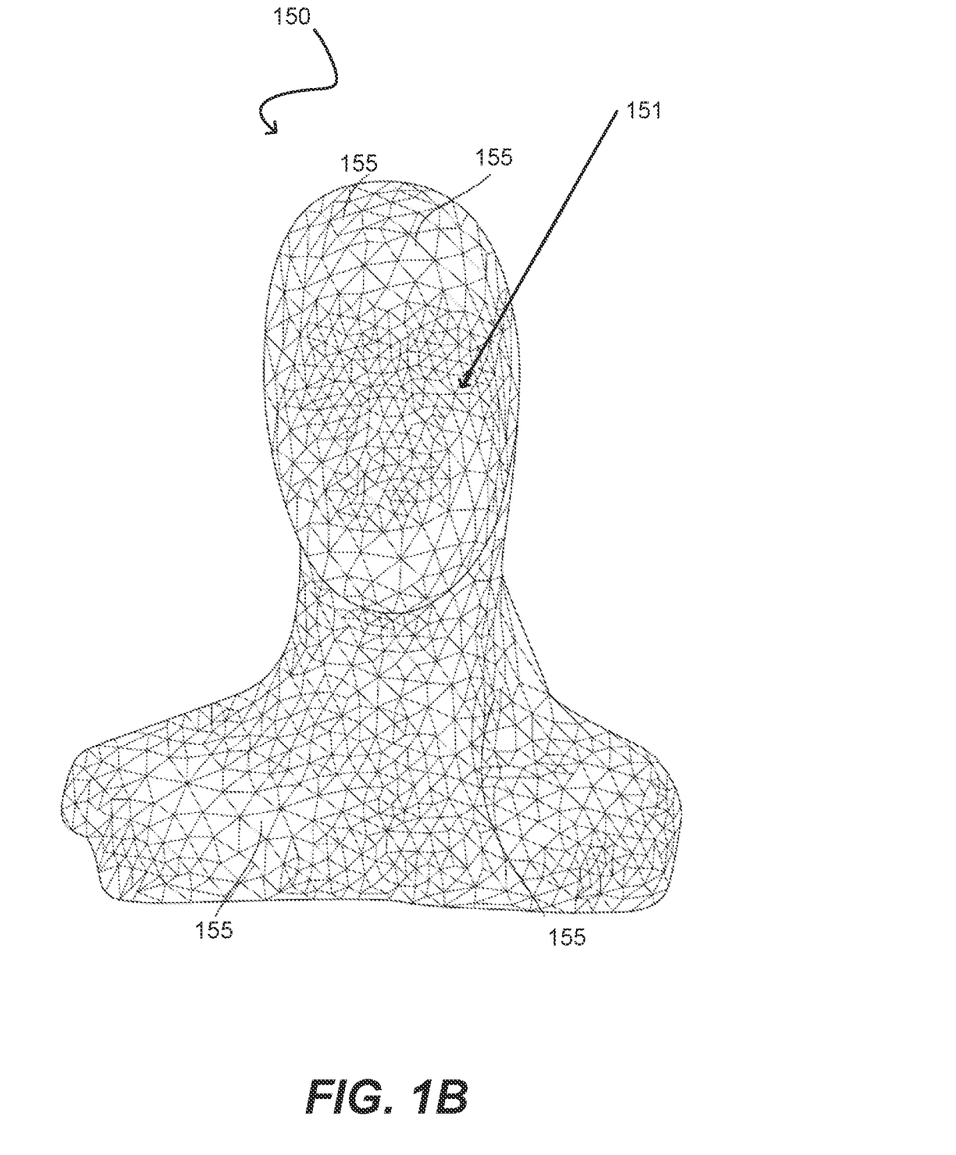
FIG. 1B is a diagram that illustrates a 3D model of an object, according to the present disclosure.

FIG. 1B is a diagram illustrating a mesh representation 150 of an object 135, according to the present disclosure.

Referring to FIG. 1B, a mesh representation 150 of the object 135 may include an exterior surface 151 that includes a plurality of polygons 155. The plurality of polygons 155 may provide a representation of an exterior surface of the object 135. For example, the plurality of polygons 155 may model features, such as features at the points 140-144, on the exterior surface of the object 135. In some embodiments, the plurality of polygons 155 may include a plurality of triangles, and are referred to as such herein. Each of the plurality of polygons 155 may have one or more vertices, which may be represented by a three-dimensional coordinate (e.g., a coordinate having three data values, such as a x-value, a y-value, and a z-value). This may be referred to herein as a "3D-coordinate."

Figure 1C:
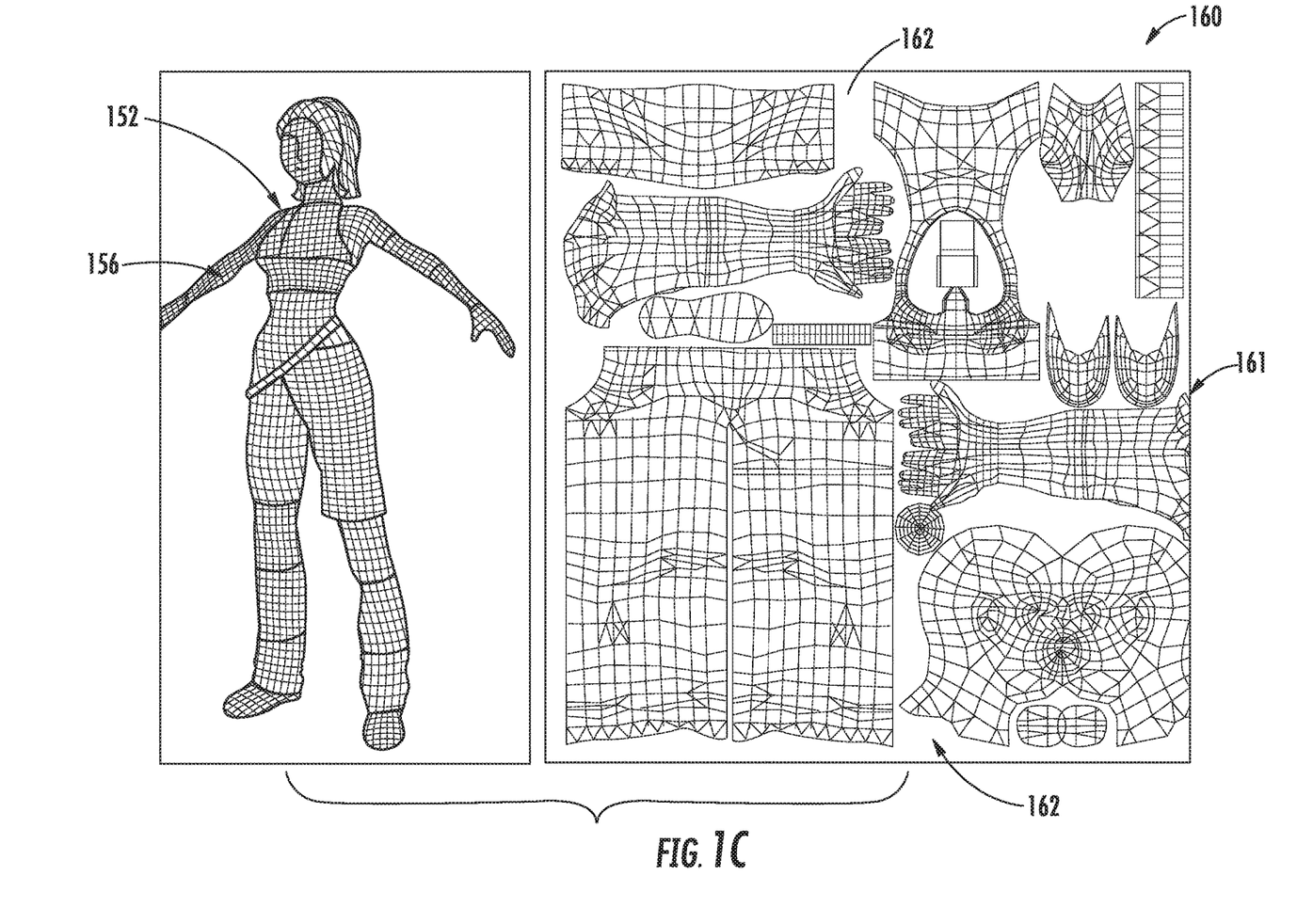
FIG. 1C is a diagram that illustrates a 3D model of an object and a texture, according to the present disclosure.

A mesh representation, such as the mesh representation 150 of FIG. 1B, is one component of a 3D model of the 3D object. In order for the virtual representation of the object to look realistic, it is desirable to add color, detail, or other texture information. This information may be stored in a texture. FIG. 1C is a diagram illustrating the relationship between a texture 160 and a mesh representation 152. Mesh representation 152 and mesh representation 150 are similar, though differ in that one is a mesh representation of a head only and the other is a mesh representation of an entire body. In addition to a three-dimensional coordinate, each vertex 156 may have a two-dimensional texture coordinate (e.g., a coordinate having two data values, such as a u-value and a v-value) indicating which part of the texture 160 corresponds to the vertex 156. The texture coordinate may be referred to herein as a "UV coordinate." A rendering engine may then apply, or sample, the texture 160 to the vertices 156, in effect "painting" each vertex, or each triangle of the mesh representation 152, with the corresponding part of the texture 160. As seen in FIG. 1C, texture 160 may have one or more islands 161, where color or other texture information associated with vertices may be located, separated by gaps 162, where color, detail, surface texture or other texture information not associated with vertices may be located. In some embodiments, this may be some static color (e.g., black).

One aspect in generating a 3D model includes recognizing that the model may be presented or displayed on a two-dimensional display device (though this is not the only possible output of generating a 3D model). Computer graphics systems include algorithms to render a 3D scene or object to a 2D screen. When rendered on a display device, the mesh may be combined in a way with the texture, by taking the 3D coordinate of the vertices and projecting them into a screen space using a camera position and parameters. These values may be provided, for example, to a vertex shader. Each pixel from the texture may be sampled using the UV coordinates. This may be performed, for example, in a fragment shader.

Figure 2A:
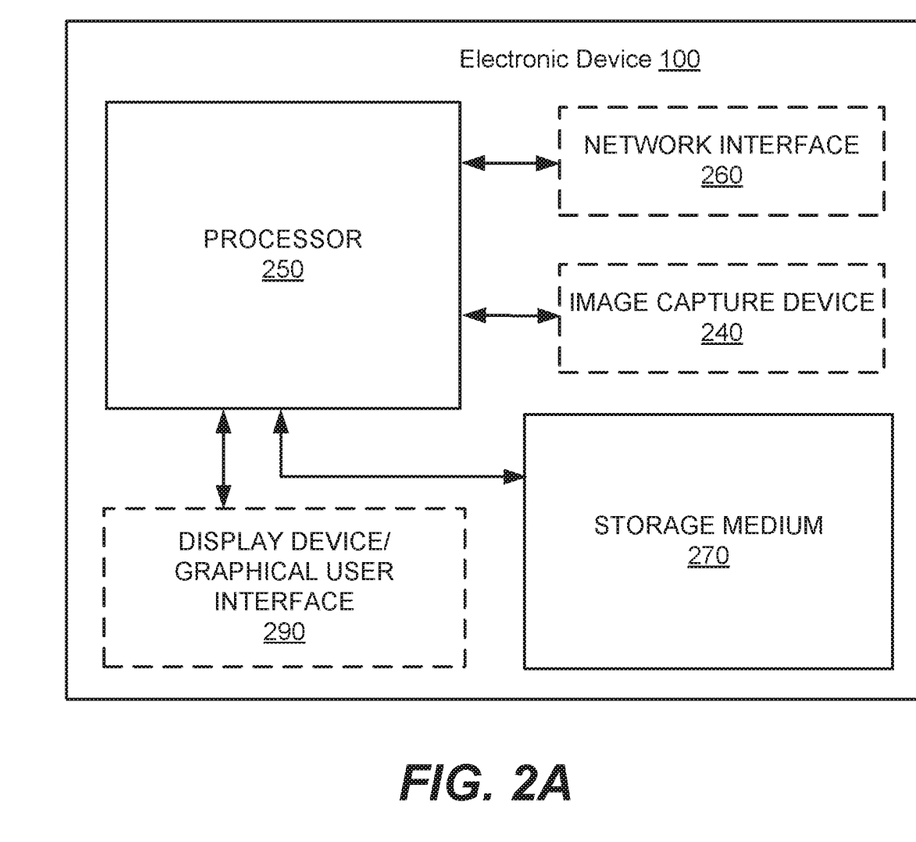
FIG. 2A is a block diagram of an electronic device of FIG. 1A, according to the present disclosure.

Referring now to FIG. 2A, a block diagram is provided of an electronic device 100 of FIG. 1A, according to the present disclosure. The electronic device 100 may include a processor 250 and a storage medium 270. Moreover, the electronic device 100 may, in some embodiments, include an image capture device 240, a network interface 260, and/or a Graphical User Interface (GUI) 290. The GUI 290 may include a display and/or a keypad or other interface that receives inputs from a user 110. In some embodiments, the GUI 290 may include a touchscreen. The image capture device 240 may be any camera or other device that captures image data of the object 135 and environment 145 that can be used to create a mesh representation and/or a texture for the 3D model. The processor 250 may be coupled to the network interface 260. The processor 250 may be configured to communicate with a device that provides image data (such as another electronic device 100) via the network interface 260.

For example, the network interface 260 may include one or more wireless interfaces (e.g., 3G/LTE, other cellular, WiFi, other short-range, etc.) and one or more physical wired interfaces (e.g., Ethernet, serial. USB interfaces, etc.).

Referring still to FIG. 2A, the storage medium 270 may be coupled to the processor 250. The storage medium 270 may also store instructions/algorithms used by the processor 250. For example, the storage medium 270 of the electronic device 100 may include one or more algorithms that create a texture for a 3D model.

The electronic device 100 may, in some embodiments, include the GUI 290. For example, a user 110 may use the GUI 290 at the electronic device 100 (i) to capture, or otherwise obtain, image data with respect to the object 135 and environment 145, (ii) to create a texture for the 3D model, (iii) to create the 3D model, (iv) to apply the texture to the 3D model in a rendered image, and/or (v) to display data corresponding to the 3D model and/or the texture.

Figure 2B:
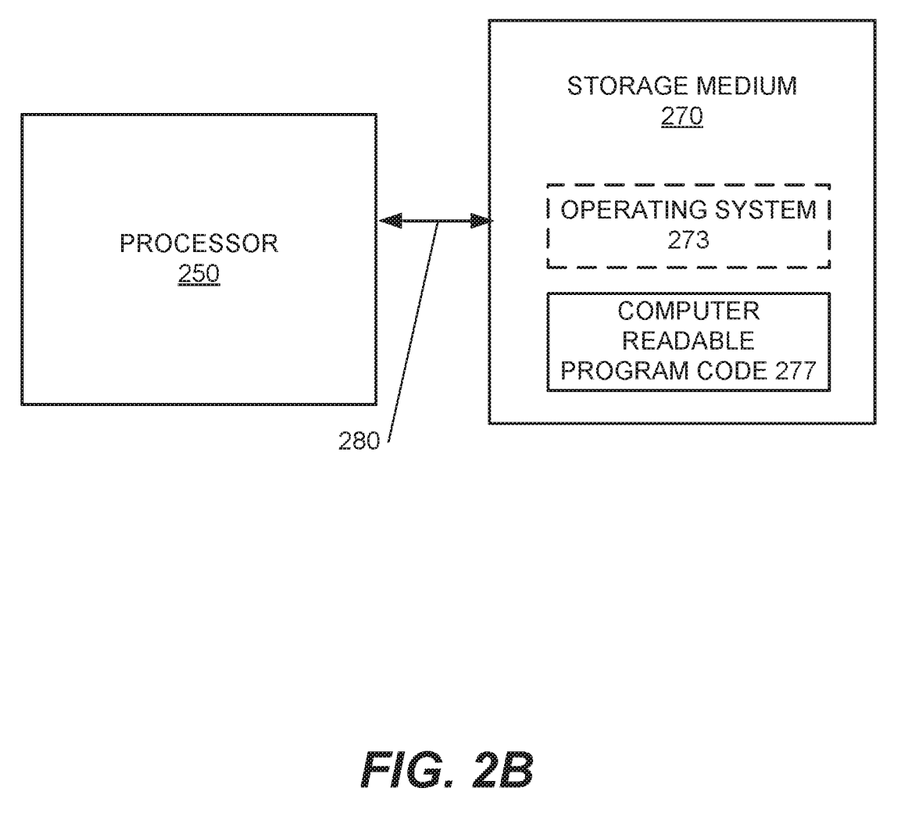
FIG. 2B is a block diagram that illustrates details of an example processor and memory that may be used in accordance with the present disclosure.

Referring now to FIG. 2B, a block diagram is provided that illustrates details of an example processor 250 and storage medium 270 of an electronic device 100 that may be used in accordance with various embodiments. The processor 250 communicates with the storage medium 270 via an address/data bus 280. The processor 250 may be, for example, a commercially available or custom microprocessor. Moreover, the processor 250 may include multiple processors. The storage medium 270 may be referred to herein as a "memory" and may be representative of the overall hierarchy of memory devices containing the software and data used to implement various functions of an electronic device 100 as described herein. The storage medium 370 may include, but is not limited to, the following types of devices: cache, ROM. PROM, EPROM, EEPROM, flash, Static RAM (SRAM), and Dynamic RAM (DRAM).

As shown in FIG. 2B, the storage medium 270 may hold various categories of software and data, such as computer readable program code 277 and/or an operating system 273. The operating system 273 controls operations of an electronic device 100. In particular, the operating system 273 may manage the resources of an electronic device 100 and may coordinate execution of various programs by the processor 250. The computer readable program code 277, when executed by the processor 250, may cause the processor 250 to perform any of the operations illustrated in the flowcharts of FIGS. 3-6, below.

As discussed above, the user 110 initiates a photographic session of the physical object 135, such as a head of a person or an automobile, at location 120a. The user 110 may physically move around the physical object 135 to various locations, such as from the location 120a to a different location 120b. An image 130 of the physical object 135 and of the environment 145 may be captured at each location. For example, image 130a is captured when the electronic device 100 is at the location 120a, and image 130b is captured when the electronic device 100 moves to the different location 120b.

It has been recognized by the inventors that creation of a texture having a high degree of detail is desirable. The captured images may be used not only to generate a mesh representation of the object, but also to derive color and detail information to use in generating a texture for the 3D model of the object. Additionally, it is desirable that the creation of the texture be completed on a relatively short timeframe, both from a computational savings (e.g., efficiency) perspective and from a user satisfaction perspective. It is known that there is at least one texture creation algorithm, provided in an article by Waechter et al. entitled "Let There Be Color! Large-Scale Texturing of 3D Reconstructions," *European Conference on Computer Vision.* Springer, Cham, 2014. The inventors have recognized several deficiencies with the Waechter methods. In the Waechter methods, for example, a global optimization is performed first, in which art input image for each triangle in the mesh is selected, with the result that each triangle in the mesh will be painted with data from one single camera image. The inventors have recognized that this has the potential to produce sub-optimal results, for example where the mesh is of a lower resolution and where the triangles are of a higher resolution. The Waechter methods also contain a complicated color adjustment step in order to handle global illumination differences. The inventors have recognized that similar quality may be achieved with greater computational efficiency by using simple weighted averaging, finally, the inventors have recognized that an increasing number of consumers are using mobile phones or other mobile devices as their primary computational devices. Although these devices are increasingly powerful, in many cases they can lack some hardware and/or computational power.

To achieve these and other objectives, provided herein are operations for creating a texture using frequency separation and/or depth buffers. As w ill be discussed further below, frequency separation includes the splitting of one or more images each into higher frequency components (which includes finer details such as facial pores, lines, birthmarks, spots, or other textural details) and lower frequency components (such as color or tone). As will be discussed further below, depth buffering includes storing a subset of the images (for example, the higher frequency components) within a depth buffer based on the Z component of their corresponding vertex from the camera coordinate system, and then keeping, storing, or using the closest pixel to the camera, as this is likely the pixel with the highest amount of sharpness or detail.

Figure 3:
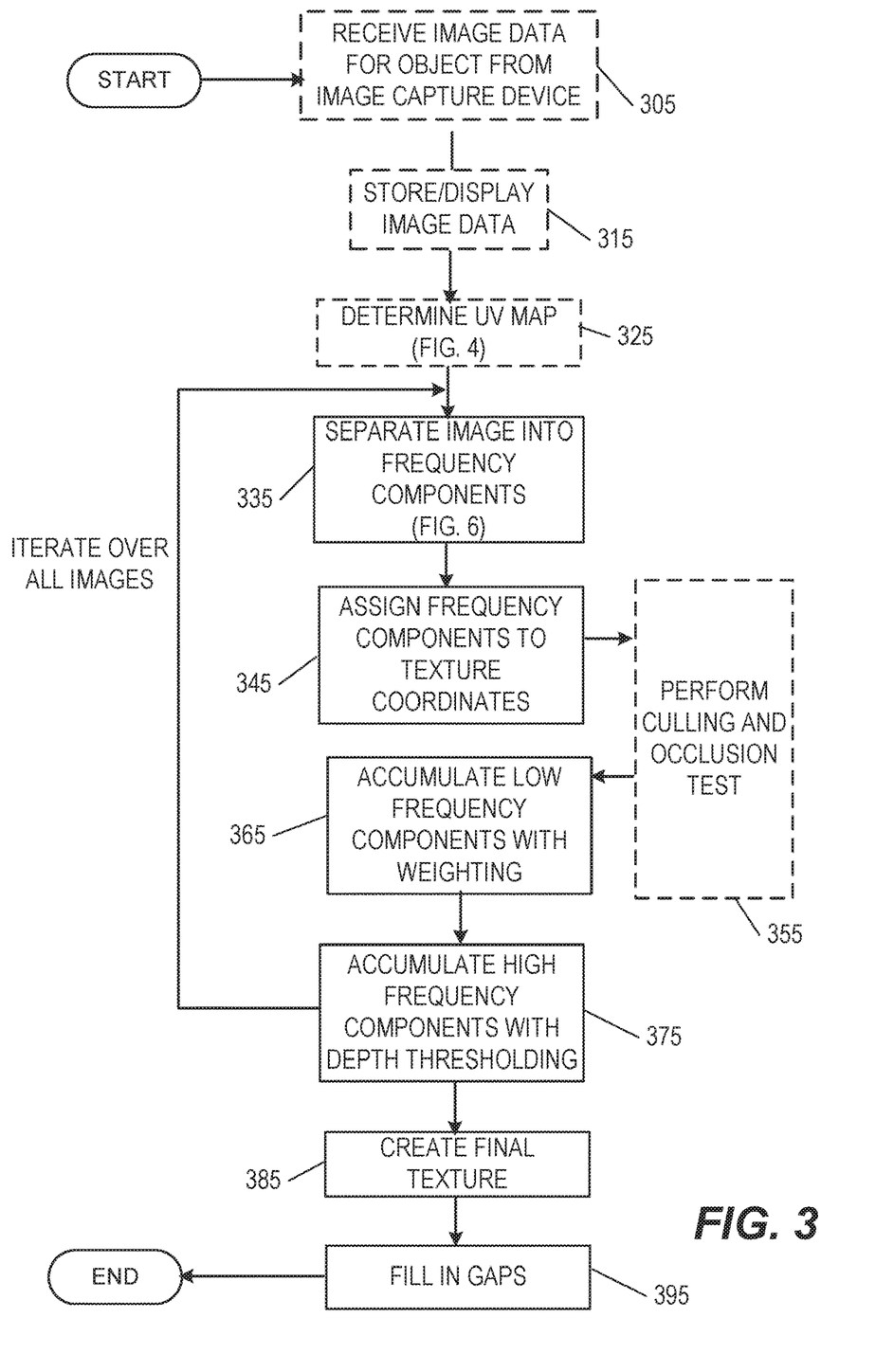
FIG. 3 is a flowchart that illustrates an example method according to the present disclosure.
Figure 4:
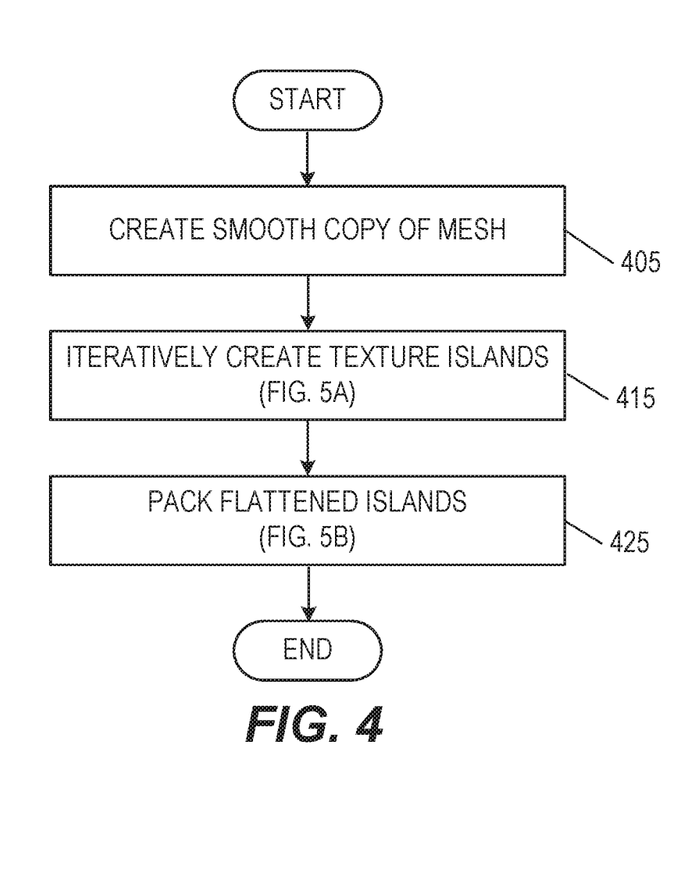
FIG. 4 is a flowchart that illustrates an example method according to the present disclosure, which may be a sub-operation of the method illustrated in the flowchart of FIG. 3.
Figure 5A:
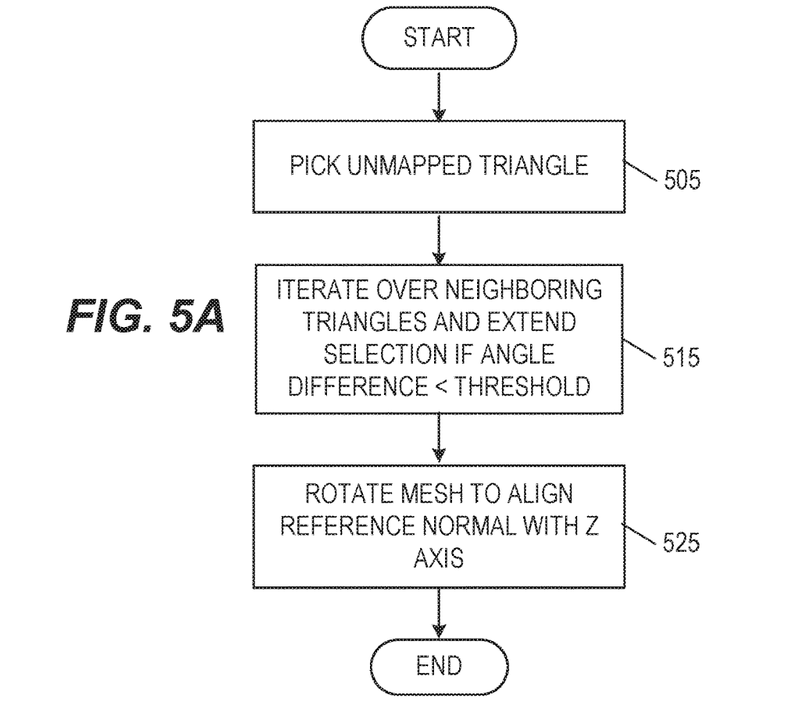
FIGS. 5A and 5B are flowcharts that illustrate example methods according to the present disclosure, which may be sub-operations of the method illustrated in the flowchart of FIG. 4.
Figure 5B:
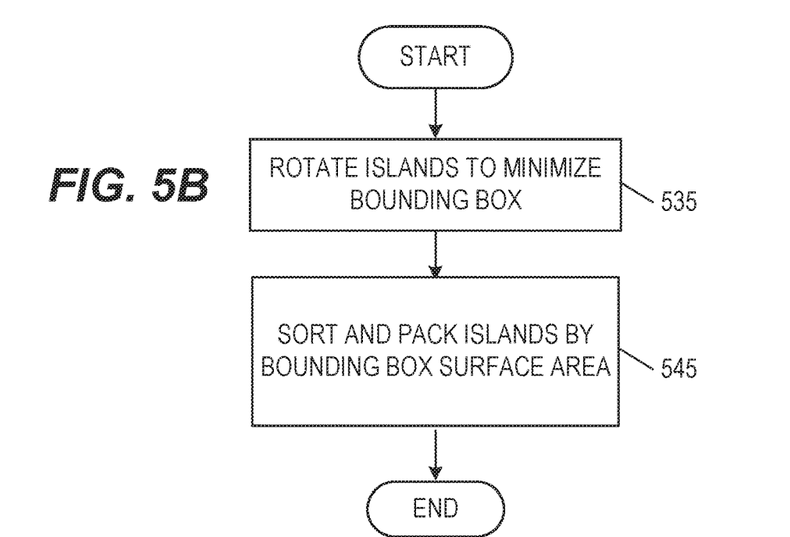
Figure 6:
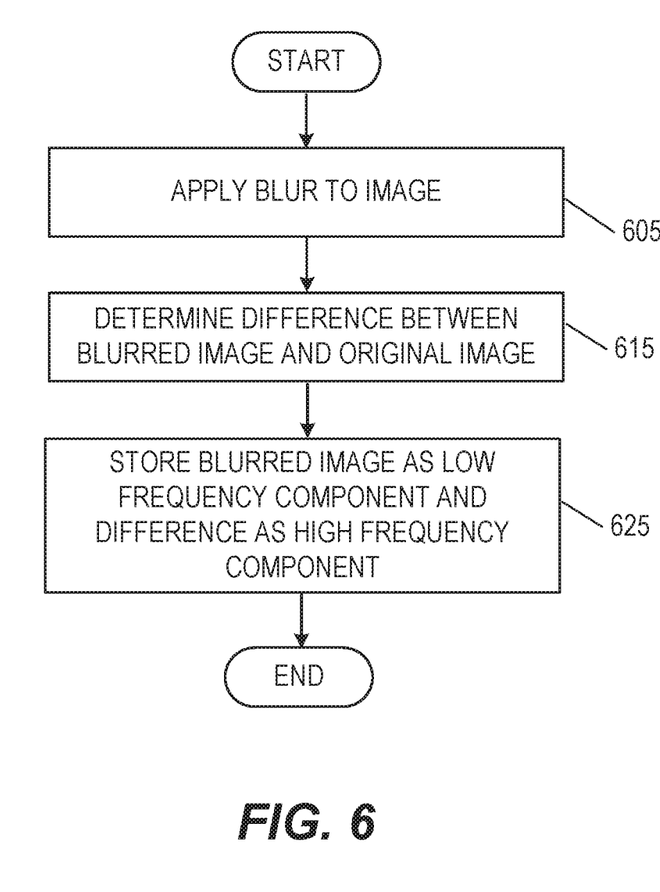
FIG. 6 is a flowchart that illustrates an example method according to the present disclosure, which may be a sub-operation of the method illustrated in the flowchart of FIG. 3.

As an example of the operations provided herein, FIG. 3 is a flowchart of operations for creating a texture using depth buffers, which may be referred to herein as depth thresholding, and using frequency separation, FIGS. 4-6 are flowcharts of example sub-operations of the operation of FIG. 3, with FIGS. 4, 5A, and 5B illustrating various aspects of a sub-operation of determining a UV map from received image data, which may be performed in some embodiments. FIG. 6 illustrates a sub-operation of FIG. 3 for separating images into their frequency components. Although an electronic device 100 may be configured to perform any of the operations in the flowcharts of FIGS. 3 to 6, one or more of the operations may, in some embodiments, be performed outside of the electronic device 100. As shown in FIG. 3, several operations (e.g., Blocks 335, 345, 355, 365, and 375) may be repealed for each image of the captured image data 130. Also, although the operations of FIG. 3 result in a single final texture image, in some embodiments multiple texture images may be generated.

Referring to FIGS. 3 and 6, operations for creating a texture include separating an image into its frequency components (Block 335). To separate an image into its frequency components, the image may blurred (Block 605). This may be performed programmatically using a blurring method such as Gaussian blur. In some embodiments, a small blur kernel may be used. For example, in some embodiments a radius of four pixels may be used. The blurred version of the image may be thought of as the "low" frequency version of the image, in that the blurring has removed the sharp or fine details of the image. As discussed above, the "low" frequency version of the image may include color and tones. A difference between the blurred "low" frequency image and the original image may be determined. (Block 615). This may be performed programmatically, for example, using a pixel-by-pixel subtraction method. The resultant difference may be thought of as the "high" frequency version of the image. As discussed above, the "high" frequency version of the image may include fine details (e.g., blemishes, birthmarks, lines, pores, and so on), but might not include color or tone data. The high frequency component may be illumination independent. The blurred image may be stored as the low frequency component of the image and the difference may be stored as the high frequency component of the image (Block 625). It is noted that summing the two components results in the original image.

Returning to FIG. 3, several buffers are used to collect information that is used to create the resultant "final" texture. Each iterated image, or the low and high frequency components thereof, is assigned to the buffers, based on the input image, the position and orientation of the camera when taking the image (e.g., the camera pose), and the mesh (Block 345). As discussed above, when rendering the mesh with a texture applied, the 3D coordinate of the vertices are used to project the vertices into a screen space using a camera position and parameters. Each pixel from the texture is sampled using the UV coordinate of the vertices. Creation of the texture, in contrast, uses the UV coordinate as destination coordinate, and sampling is performed from the input image, using the projected 3D vertex coordinate. Accordingly, each pixel from the input image 130 (or the low frequency and high frequency versions of the input image 130) are stored in the buffers.

As discussed above, the low frequency component may include the overall color of the object 135. Although this data may be sensitive to illumination differences (e.g., because of lighting differences in the environment 145 where the images 130 were captured), the low frequency components do not include the details of the object 135. Therefore, to combine low frequency components of different images, it is permissible to average these values of the image (Block 365). For example, a first low frequency component from a first image 130 and a second low frequency component from a second image 130 may be added together on a per-pixel basis. Each pixel may receive a weight, which may be, in some embodiments, stored in the alpha color channel. Color data stored in color channels (e.g., red-green-blue (RGB) channels) may be pre-multiplied with this weight. In some aspects, the weight may be calculated based on the viewing direction and the triangle normal (or a normal of another polygon representing the object 135). For example, higher w eights may be given if the corresponding triangle is facing towards the camera.

As the images 130 of the captured image data are iterated, a weighted sum of the low frequency components may be generated in a buffer. In some embodiments, this buffer may be an accumulation buffer (e.g., a buffer with floating point values per color channel). Additionally, the sum of weights may be stored in the alpha channel of the accumulation buffer. In this way, it is computationally inexpensive to calculate the average color of the pixels. Due to the averaging, any illumination differences between images may be reduced, or smoothed out.

In some embodiments, accumulation of low frequency components (Block 365) may also accumulate the square of the low frequency. This may enable calculation of the mean and standard deviation for every pixel, to assist in detection and removal of specular highlights.

Although the RGB color space is discussed above, in some aspects, a different color space may be used. For example, hue-saturation-lightness (HSL) color spaces or luma, blue-difference chroma, and red-difference chroma (YCrCb) color spaces may be used. This may permit the usage of standard deviation to adjust the final YCrCb values. For example, using the YCrCb color space may permit the retention of a more saturated value, by increasing the CrCb channels based on standard deviation as well as retention of darker values by decreasing the Y channel. This may assist in the removal of specular highlights.

As with the accumulation and storage of low frequency components, the high frequency components may also be accumulated and stored (Block 375). Unlike the low frequency components, where blurring and weighting may result in a blended per-pixel value based on multiple images, each high frequency component pixel in the texture may be based on a single input image. This will enable retention of image sharpness, including the aforementioned image details. High frequency components are therefore stored in a buffer differently from the low frequency images. For example, pixels might not be averaged and weighted, and instead data from later processed images may "replace" data from earlier processed images. For example, a depth map may be allocated for the high-frequency component buffer, and a depth test may be performed. The Z component of the corresponding vertex from the camera coordinate system may be used as a depth value. The result is that, for each pixel in the texture, the "closest" pixel to the camera will be kept. As discussed above, this "closest" pixel likely has the highest image sharpness and the greatest amount of image detail.

In some embodiments, an angle difference between a normal of the corresponding vertex and the camera direction may be used as a threshold. This may reduce errors in the accumulation process. For example, if the angle difference is above a threshold the pixel may be ignored, since it is likely an outlier. The threshold may be, as an example, 80 degrees. Additionally and/or alternatively, if the angle difference is above a lower threshold, the pixel may be processed, however the camera distance will be increased. This may result in the pixel being assigned a higher Z value, with a corresponding increased chance of being filtered out during the depth test (because a pixel closer to the camera exists).

As previously discussed, each of the several operations discussed above (e.g., Blocks 335, 345, 365, and 375) may be performed for each image of the captured image data 130. After each image has been processed, a final texture may be created (Block 385). This may result in the creation of a single texture from the buffers (e.g., the low frequency buffer and the high frequency buffer). The buffers may be summed by adding the data from the low frequency buffer (divided by the weight, which as discussed above may be stored in the alpha channel), with the high frequency buffer. The result is a texture for the 3D model with data for each vertex of the 3D model.

As discussed above with reference to FIG. 1C, there may be gaps between islands of the texture. Although these gaps might not correspond to surfaces of the 3D model, it may be desirable to fill in the gaps with data (Block 395). For example, many applications use mipmapping when rendering a mesh. In mipmapping, a scaled down version of the texture is created, which may sampled from a level which matches the rendering distance. A negative aspect of mipmapping is that when scaling down the texture, color from the gap area will bleed into the scaled down image. For example, where the color black is used as a default "gap" color, black lines may appear in the rendered mesh.

To avoid mipmapping problems, in some embodiments, gaps may be filled with a pyramid scale down+up approach. First, scaled down versions of the texture may be created. For example, a scale down factor of 2 may be used, and result in the combination of 4 pixels in the original texture being combined via averaging into 1 pixel. The alpha channel of the pixels may be checked to ensure that only valid pixels are used in the combining process. In some embodiments, if the number of valid pixels is too low (e.g. a single pixel), an empty pixel may be produced. This scale down process may be repeated as needed. The resultant textures may be then increased in scale, by combining a scaled down texture with the one step higher resolution texture. In this way, if a gap exists in the higher resolution texture, it may be filled with data from the lower resolution image. In some aspects, the process may be repeated for square sizes down to 1 pixel by 1 pixel. This may result in gaps of the original sized texture will be filled in, as gaps between islands may be filled via interpolation.

Various operations may, in some embodiments, be performed before separating the image into its frequency components (Block 335). The operations may include receiving (Block 305), in a storage medium 270 (FIG. 2A), image data for a physical object 135 from an image capture device 240 (FIG. 2A). In some embodiments, the same electronic device 100 that captures the image data may separate the image data into frequency components (Block 335). Alternatively, one device may capture the image data and a different device may separate the image data into frequency components. Moreover, operations of receiving (Block 305) the image data may refer to storing image data in the same electronic device 100 that captured the image data, or to receiving the image data from another device via a network interface 260 (FIG. 2A). In some embodiments, the image data may refer to photos or to frames from a video stream. In addition to, or as an alternative to, operations of Block 305, operations may, in some embodiments, include storing/displaying image data (Block 315). For example, the image data may be stored in a storage medium 270 (FIG. 2A) of an electronic device 100 and/or displayed on a display of a GUI 290 (FIG. 2A) of the electronic device 100. As an example, a user 110 of the electronic device 100 may desire to view 2D images 130 before creating a 3D model that is based on the 2D images 130.

Additionally, in some embodiments, the mesh representation of the physical object may lack a UV map. Accordingly, in some embodiments, a UV map may be created (Block 325, which also corresponds to FIG. 4). The UV mapping may map each vertex in the mesh to a 2D coordinate in the texture. To create the UV map, a smoothed copy of the mesh 152 is created (Block 405). This may reduce high frequency surface noise in the mesh. A mesh selection may then be iteratively created (Block 415, which corresponds to FIG. 5A). To iteratively create a mesh selection, a first triangle of the mesh 152 that has not been mapped to the texture is selected (Block 505). A reference normal (e.g., perpendicular) is set to the normal of the selected first triangle. Each neighboring triangle to the selected first triangle is examined, and included in the mesh selection if the angle difference between the neighboring triangle and the reference normal is smaller than a threshold (Block 515). If the neighboring triangle is added to the selection, the reference normal may be updated to be the average of the normals of the triangles in the selection. After each neighbor, and each neighbor of neighbor, and so on, is examined, and no further triangles can be added to the selection, the mesh selection may be rotated so the reference normal is aligned with the Z axis (Block 525), and the mesh selection may be flattened into 2D by discarding the Z coordinates of the triangles in the selection. This results in a texture island (Block 415).

After all triangles of the mesh have been processed, the resultant texture islands may be packed into the texture map (Block 425, which corresponds to FIG. 5B). The packing algorithm may work with bounding boxes of each island. First, each island may be rotated in order to minimize the surface area of the bounding box (Block 535). Then, the islands may be sorted and packed by bounding box surface area, in descending order (Block 545). To pack the islands by bounding box surface area in descending order, the largest (first) island may be placed in a corner of the texture. Each remaining island may be iterated. During the iteration, it is attempted to try and attach a corner of the current island to a corner of an already packed island. Only possible attachments may be used; for example, attachments which extend beyond the size parameters of the texture may not be used. A scoring function may be used to determine an optimal placement of the current island. A score may be calculated based on the aspect ratio of the bounding box of all previously placed boxes. In some embodiments, a square texture (2048×2048) is generated, and a result may be a preference for an aspect ratio of 1:1. A generic formula may be used:

$$\text{score} = 2 - \left| \frac{\pi}{4} - \arctan(\text{height} * \text{aspect, width}) \right|$$

In some embodiments, after all triangles are packed, coordinates of the texture may be normalized such that the range along both the X and Y axis is in between 0 and 1.

Various operations may, in some embodiments, may be performed after assigning frequency components to texture coordinates (Block 345). For example, when texture coordinates are used a as destination coordinates, there might be no overlap in the rendered triangles, and each triangle may be painted, even if it would be occluded in the 3D space. To address this issue, culling and an occlusion test may be used (Block 355). For example, back-facing triangles may be filtered out, and a comparison of the Z distance of a rendered fragment to a value from a pre-rendered depth map of the mesh may be performed.

In addition to or in the alternative to the culling and occlusion of Block 355, in some aspects Block 355 may include edge detection. For example, there may be a risk of painting the wrong pixel from the input image into the texture. This risk may result from errors in the camera pose, which might result in the background being painting onto the foreground. To address or account for this issue, a depth mask may be created, and an edge detection algorithm may be performed on the pre-rendered depth map. Pixels from the input image which are close to these edges may not be processed.

Finally, as discussed above, in some embodiments the depth test (Block 375) may be omitted. For example, where a face detection scanning algorithm is utilized and is successful, a single image having coverage for the face may be selected and applied or "painted" into the high frequency layer. This may result in a reduction of any "scams" in the face that might arise from the combination of two or more images.

Specific example embodiments of the present inventive concepts are described with reference to the accompanying drawings. The present inventive concepts may, however, be embodied in a variety of different forms and should not be construed as limited to the embodiments set forth herein. Rather, these embodiments are provided so that this disclosure will be thorough and complete and will fully convey the scope of the present inventive concepts to those skilled in the art. In the drawings, like designations refer to like elements. It will be understood that when an element is referred to as being "connected," "coupled," or "responsive" to another element it can be directly connected, coupled or responsive to the other element or intervening elements may be present. Furthermore, "connected," "coupled," or "responsive" as used herein may include wirelessly connected, coupled, or responsive.

The terminology used herein is for the purpose of describing particular embodiments only and is not intended to be limiting of the present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present inventive concepts.

Example embodiments of the present inventive concepts may be embodied as nodes, devices, apparatuses, and methods. Accordingly, example embodiments of the present inventive concepts may be embodied in hardware and/or in software (including firmware, resident software, microcode, etc.). Furthermore, example embodiments of the present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the specification, various embodiments of the present inventive concepts have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of the present inventive concepts. The present inventive concepts are defined by the following claims, with equivalents of the claims to be included therein.

What is claimed is:

1. A method of creating a texture for a three-dimensional (3D) model based on captured image data comprising a plurality of images, the method comprising:
   separating each image from the captured image data into frequency components, wherein the frequency components comprise a low frequency component and a high frequency component for each image;
   assigning the low and high frequency components of each image to texture coordinates of the texture;
   accumulating the low frequency components of the plurality of images, resulting in accumulated low frequency components;
   accumulating the high frequency components of the plurality of images, resulting in accumulated high frequency components;
   combining the accumulated low frequency components and the accumulated high frequency components, resulting in the texture, the texture having a first resolution;
   creating, from the texture, a second version of the texture having a second resolution lower than the first resolution; and
   applying data to one or more gaps of the texture based on data from the second version of the texture, wherein the one or more gaps of the texture to which data are applied are non-corresponding with surfaces of the 3D model.

2. The method of claim 1, wherein the plurality of images comprises a first image, and wherein separating into frequency components comprises:
   blurring the first image, resulting in a low frequency component of the first image; and
   determining a difference between the first image and the low frequency component, resulting in a high frequency component of the first image.

3. The method of claim 2, wherein a four pixel blur kernel is used to blur the first image.

4. The method of claim 1, wherein the plurality of images comprises a first image and a second image, and wherein the accumulating the low frequency components comprises adding a low frequency component of the first image to a low frequency component of the second image.

5. The method of claim 4, wherein the low frequency component of the first image comprises a first color value, wherein the low frequency component of the second image comprises a second color value, and wherein the adding the low frequency component of the first image to the low frequency component of the second image comprises adding the first color value and the second color value.

6. The method of claim 1, wherein accumulating the high frequency components of the plurality of images comprises comparing depth values of the high frequency components of the plurality of images and storing a pixel having a lowest depth value of the depth values that are compared.

7. The method of any of claim 1, further comprising:
   receiving, in a storage medium, the captured image data from an image capture device.

8. The method of claim 1, wherein the captured image data comprises image data representative of a physical object, the method further comprising:
   determining a texture mapping for a mesh representation of the physical object.

9. The method of claim 8, wherein the determining the texture mapping for the mesh representation comprises:
   creating a smooth copy of the mesh representation;
   creating one or more texture islands to be packed into the texture mapping; and
   packing the one or more texture islands into the texture mapping.

10. An electronic device comprising:
    a processor; and a storage device that is coupled to the processor and comprises computer readable program code therein that when executed by the processor causes the processor to perform the method of claim 1.

11. A computer program product comprising:

a non-transitory computer readable storage medium comprising computer readable program code therein that when executed by a processor causes the processor to perform the method of claim 1.

12. A computer program product comprising:

a non-transitory computer readable storage medium comprising computer readable program code therein that when executed by a processor causes the processor to perform operations comprising:

separating each image of a plurality of images into frequency components, wherein the frequency components comprise a low frequency component and a high frequency component for each image;

assigning the low and high frequency components of each image to texture coordinates of a texture;

accumulating the low frequency components of the plurality of images, resulting in accumulated low frequency components;

accumulating the high frequency components of the plurality of images, resulting in accumulated high frequency components;

combining the accumulated low frequency components and the accumulated high frequency components, resulting in the texture, the texture having a first resolution;

creating, from the texture, a second version of the texture having a second resolution lower than the first resolution; and applying data to one or more gaps of the texture based on data from the second version of the texture, wherein the one or more gaps of the texture to which data are applied are non-corresponding with surfaces of a three-dimensional (3D) model.

13. The computer program product of claim 12, wherein the plurality of images comprises a first image, and wherein separating into frequency components comprises:

blurring the first image, resulting in a low frequency component of the first image; and determining a difference between the first image and the low frequency component, resulting in a high frequency component of the first image.

14. The computer program product of claim 12, wherein the plurality of images comprises a first image and a second image, and wherein the accumulating the low frequency components comprises adding a low frequency component of the first image to a low frequency component of the second image.

15. The computer program product of claim 12, wherein accumulating the high frequency components of the plurality of images comprises comparing depth values of the high frequency components of the plurality of images and storing a pixel having a lowest depth value of the depth values that are compared.

16. An electronic device comprising:

a processor; and a storage device that is coupled to the processor and comprises computer readable program code therein that when executed by the processor causes the processor to perform operations comprising:

separating each image of a plurality of images into frequency components, wherein the frequency components comprise a low frequency component and a high frequency component for each image;

assigning the frequency components of each image to texture coordinates of a texture;

accumulating the low frequency components of the plurality of images, resulting in accumulated low frequency components;

accumulating the high frequency components of the plurality of images, resulting in accumulated high frequency components;

combining the accumulated low frequency components and the accumulated high frequency components, resulting in the texture, the texture having a first resolution;

creating, from the texture, a second version of the texture having a second resolution lower than the first resolution; and applying data to one or more gaps of the texture based on data from the second version of the texture, wherein the one or more gaps of the texture to which data are applied are non-corresponding with surfaces of a three-dimensional (3D) model.

17. The electronic device of claim 16, wherein the plurality of images comprises a first image, and wherein separating into frequency components comprises:

blurring the first image, resulting in a low frequency component of the first image; and determining a difference between the first image and the low frequency component, resulting in a high frequency component of the first image.

18. The electronic device of claim 16, wherein the plurality of images comprises a first image and a second image, and wherein the accumulating the low frequency components comprises adding a low frequency component of the first image to a low frequency component of the second image.

19. The electronic device of claim 16, wherein accumulating the high frequency components of the plurality of images comprises comparing depth values of the high frequency components of the plurality of images and storing a pixel having a lowest depth value of the depth values that are compared.

* * * * *